US011908460B2

(12) United States Patent
Duong et al.

(10) Patent No.: US 11,908,460 B2
(45) Date of Patent: Feb. 20, 2024

(54) USING A GENERATIVE ADVERSARIAL NETWORK TO TRAIN A SEMANTIC PARSER OF A DIALOG SYSTEM

(71) Applicant: Oracle International Corporation, Redwood Shores, CA (US)

(72) Inventors: Thanh Long Duong, Seabrook (AU); Mark Edward Johnson, Castle Cove (AU)

(73) Assignee: Oracle International Corporation, Redwood Shores, CA (US)

( * ) Notice: Subject to any disclaimer, the term of this patent is extended or adjusted under 35 U.S.C. 154(b) by 773 days.

(21) Appl. No.: 16/992,306

(22) Filed: Aug. 13, 2020

(65) Prior Publication Data
US 2021/0074274 A1 Mar. 11, 2021

Related U.S. Application Data

(60) Provisional application No. 62/898,682, filed on Sep. 11, 2019.

(51) Int. Cl.
| | |
|---|---|
| *G10L 15/16* | (2006.01) |
| *G10L 15/18* | (2013.01) |
| *G06F 40/226* | (2020.01) |
| *G10L 15/22* | (2006.01) |
| *G10L 15/26* | (2006.01) |

(52) U.S. Cl.
CPC ........ *G10L 15/1815* (2013.01); *G06F 40/226* (2020.01); *G10L 15/16* (2013.01); *G10L 15/22* (2013.01); *G10L 15/26* (2013.01)

(58) Field of Classification Search
CPC ...................................................... G10L 15/26
See application file for complete search history.

(56) References Cited

U.S. PATENT DOCUMENTS

2008/0059196 A1* 3/2008 Huang .................. G06F 16/686
704/270

OTHER PUBLICATIONS

Goodfellow, et al., "Generative Adversarial Nets," arXiv:1406.2661, 2014. (Year: 2014).*
Su, "Dialogue Generation with GAN," The Thirty-Second AAAI Conference on Artificial Intelligence (AAAI-18). (Year: 2018).*
Gao, et al., "Voice Impersonation Using Generative Adversarial Networks," IEEE ICASSP 2018. (Year: 2018).*
Goodfellow, et al., "Generative Adversarial Nets," arXiv:1406.2661, 2014—see attached reference in the previous Office action. (Year: 2014).*

(Continued)

*Primary Examiner* — Feng-Tzer Tzeng
(74) *Attorney, Agent, or Firm* — Kilpatrick Townsend & Stockton LLP

(57) ABSTRACT

Disclosed herein are techniques for using a generative adversarial network (GAN) to train a semantic parser of a dialog system. A method described herein involves accessing seed data that includes seed tuples. Each seed tuple includes a respective seed utterance and a respective seed logical form corresponding to the respective seed utterance. The method further includes training a semantic parser and a discriminator in a GAN. The semantic parser learns to map utterances to logical forms based on output from the discriminator, and the discriminator learns to recognize authentic logical forms based on output from the semantic parser. The semantic parser may then be integrated into a dialog system.

20 Claims, 8 Drawing Sheets

(56) References Cited

OTHER PUBLICATIONS

Su, et al., "Dialogue Generation with GAN," The Thirty-Second AAAI Conference on Artificial Intelligence (AAAI-18)—see attached reference in the previous Office action. (Year: 2018).*
Hou, et al., "Sequence-to-Sequence Data Augmentation for Dialogue Language Understanding", Cornell University Library, Jul. 4, 2018, 12 pages.
Kim, et al., "Onenet: Joint Domain, Intent, Slot Prediction for Spoken Language Understanding", 2017 IEEE Automatic Speech Recognition and Understanding Workshop (ASRU), Dec. 16, 2017, pp. 547-553.
Masumura, et al., "Adversarial Training for Multi-Task and Multi-Lingual Joint Modeling of Utterance Intent Classification", Proceedings of the 2018 Conference on Empirical Methods in Natural Language Processing, Oct. 31-Nov. 4, 2018, pp. 633-639.
International Application No. PCT/US2020/046072, "International Search Report and Written Opinion", dated Nov. 18, 2020, 12 pages.
PCT/US2020/046072, "International Preliminary Report on Patentability", dated Mar. 24, 2022, 9 pages.

* cited by examiner

USING A GENERATIVE ADVERSARIAL NETWORK TO TRAIN A SEMANTIC PARSER OF A DIALOG SYSTEM

CROSS-REFERENCE TO RELATED APPLICATIONS

The present disclosure claims priority to U.S. Provisional Application Ser. No. 62/898,682 for "Utilizing a Generative Adversarial Network to Train a Semantic Parser," filed Sep. 11, 2019, which is incorporated by reference herein in its entirety.

TECHNICAL FIELD

The present disclosure relates to dialog systems and, more particularly, to techniques for using a generative adversarial network to train a semantic parser for use in a dialog system, such that the semantic parser may effectively learn to generate logical forms based on the adversarial context of the generative adversarial network.

BACKGROUND

An increasing number of devices now enable users to interact with the devices directly using voice or spoken speech. For example, a user can speak to such a device in a natural language, and in doing so, the user can ask a question or make a statement requesting an action to be performed. In response, the device performs the requested action or responds to the user's question using audio output. Since interacting directly using voice is a more natural and intuitive way for humans to communicate with their surroundings, the popularity of such speech-based systems is growing at an astronomical rate.

BRIEF SUMMARY

A dialog system is a voice-enabled system capable of having a dialog with a user, such as via speech inputs and audio outputs. Typically, a dialog system includes ones or multiple machine learning (ML) models, such as a semantic parser. [0001] The present disclosure relates to techniques for using a generative adversarial network (GAN) to train a semantic parser of a dialog system. For instance, in some embodiments, a GAN includes a semantic parser as its generator and further includes a discriminator and an error-minimization module. In some embodiments, the semantic parser and the discriminator are ML models trained as adversaries, causing both ML models to improve jointly.

In some embodiments, seed data is used as training input into the GAN. The seed data may include a set of seed tuples, each seed tuple including an utterance and a logical form corresponding to the utterance. An embodiment described herein trains the semantic parser and the discriminator jointly, by first fixing the semantic parser while training the discriminator based on semantic parser output and then fixing the discriminator while training the semantic parser based on discriminator output, and repeating until the seed data is used up.

While the semantic parser is fixed and thus static, the semantic parser may generate logical forms based on randomly selected utterances. Together, each pair of a randomly selected utterance and the corresponding logical form, as generated by the semantic parser, may form a generated tuple. The discriminator may receive as input the generated tuples along with seed tuples. For each such tuple, the discriminator may output (i.e., predict) a probability that the tuple is authentic or, in other words, a probability that the tuple is a seed tuple. The error-minimization module may generate a training signal to train the discriminator based on a divergence of the discriminator's predictions as compared to an accurate distribution (i.e., an accurate sequence of values) indicating whether the tuples are authentic.

When the discriminator is fixed and thus static, the semantic parser may generate logical forms based on utterances selected from seed tuples of the seed data. Together, each pair of an utterance from the seed data and a corresponding logical form, as generated by the semantic parser, may form a tuple. The discriminator may receive such tuples as input and, for each tuple, may predict a probability that the tuple is authentic. The error-minimization module may generate a training signal to train the semantic parser based on a divergence of the discriminator's actual predictions of authenticity as compared to a desired set of predictions in which all generated logical forms are predicted to be authentic. In other words, the semantic parser is trained with an aim to fool the discriminator into deeming all generated logical forms to be authentic.

As a result, the semantic parser and the discriminator may be trained jointly as members of the GAN, with the semantic parser learning to generate logical forms and the discriminator learning to recognize logical forms. Eventually, as the discriminator improves and thus causes the semantic parser to improve, the semantic parser may become so good at generating logical forms that the logical forms generated are indistinguishable from logical forms belonging the seed data. In this manner, the semantic parser is trained to generate logical forms based on utterances.

The foregoing, together with other features and embodiments will become more apparent upon referring to the following specification, claims, and accompanying drawings.

DETAILED DESCRIPTION

Figure 1:
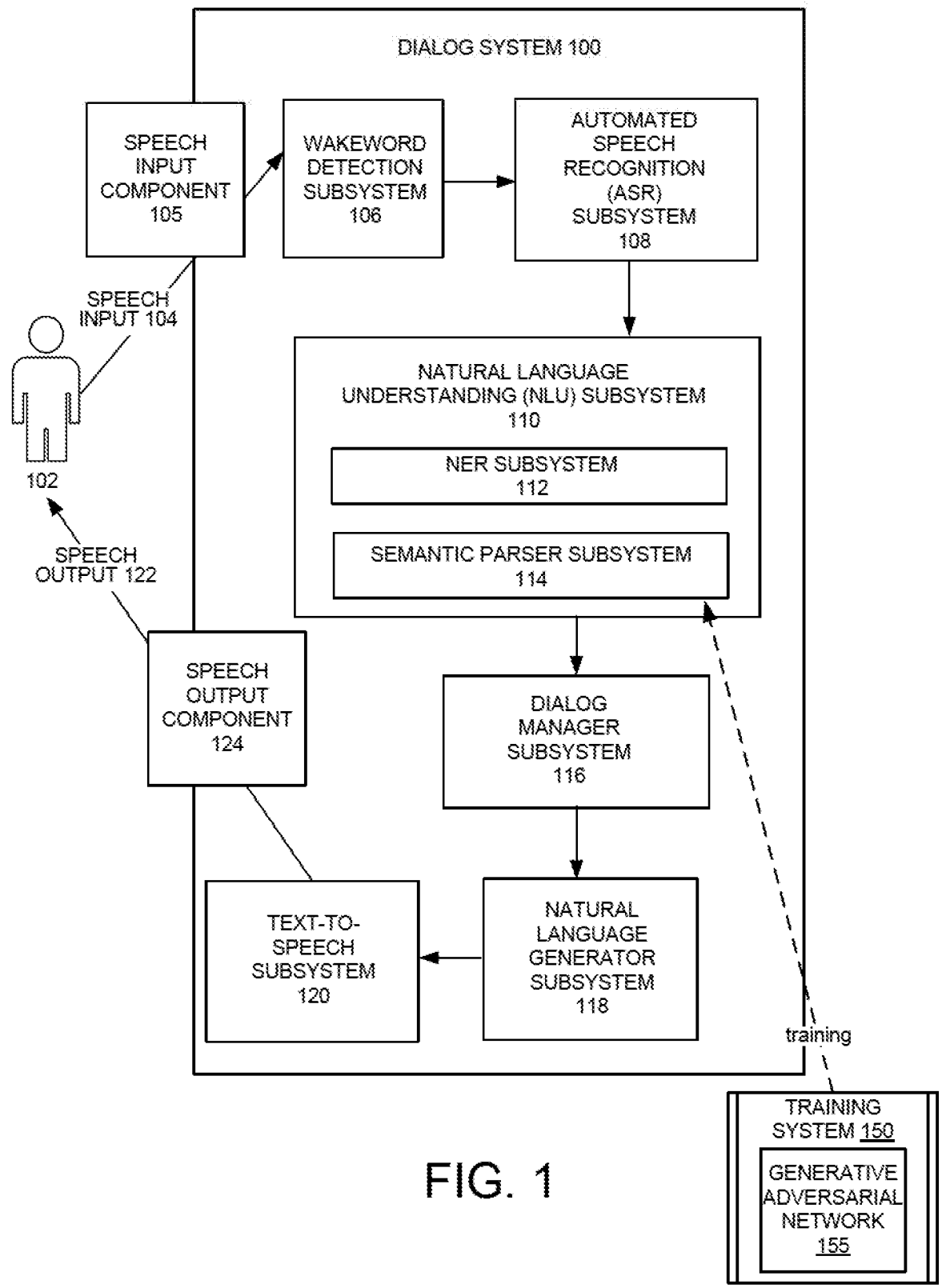
FIG. 1 is a diagram of a dialog system incorporating a semantic parser trained in a generative adversarial network, according to certain embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

A voice-enabled system that is capable of having a dialog with a user via speech inputs and audio outputs, also referred to as voice outputs, can come in various forms. For example, such a system may be provided as a stand-alone device, as a digital or virtual assistant, as a voice-capable service, or the like. In each of these forms, the system is capable of receiving speech inputs, understanding the speech inputs, generating responses or taking actions responsive to the speech inputs, and outputting the responses using audio outputs. In certain embodiments, the dialog functionality in such a voice-enabled system is provided by a dialog system or infrastructure ("dialog system"). The dialog system is configured to receive speech inputs, interpret the speech inputs, maintain a dialog, possibly perform or cause one or more actions to be performed based on interpretations of the speech inputs, prepare appropriate responses, and output the responses to the user using audio output.

Conventionally, a dialog system includes various machine learning (ML) models, and a large amount of training data is needed to train the various machine learning models of the dialog system. One of such ML models is a semantic parser subsystem, also referred to as a semantic parser. Generally, the semantic parser receives an utterance representing speech input provided by a user, where the utterance is a textual representation of natural language. The semantic parser maps that utterance to a logical form, which is a representation of the utterance as translated into a logic-based language conforming to an established grammar and thus parseable by a dialog manager subsystem of the dialog system. The dialog manager subsystem then parses and processes the logical form to determine how to respond.

To train the semantic parser subsystem, a training system associated with the dialog system typically requires a large quantity of tuples, each tuple including an utterance (e.g., a textual representation of natural language) and a corresponding logical form. When an insufficient amount of training data is used, the semantic parser may be less effective than desired and may introduce errors into a logical form and, thus, into a workflow of the dialog system. As a result of the introduction of an error in the logical form, the dialog manager subsystem might then fail to generate an appropriate response to the user.

A generative adversarial network (GAN) is an architecture that trains a generator and a discriminator in an adversarial manner. GANs are typically used in image analysis and, particularly, in the field of machine vision. In an example conventional GAN, an image generator generates images intended to be in a specific class (e.g., images of faces), and the discriminator determines whether the generated images are indeed in that class. By comparing the outputs of the image generator and the discriminator to accurate distributions of outputs, the GAN provides a training signal to the image generator and to the discriminator to train the image generator and the discriminator. GANs are particularly useful when the training data available is smaller than would be ideal for individual training, because the adversarial nature can lead to effective training with a relatively small set of training data.

In some embodiments of a training system described herein, a semantic parser of a dialog system is trained in a GAN. Specifically, the semantic parser may behave as a generator of the GAN and, as such, may learn generate logical forms, and a discriminator may lean to distinguish between authentic and inauthentic logical forms. An error-minimization module may apply one or more objective functions to provide a training signal to train the semantic parser and the discriminator. After training, the semantic parser may be used to map utterances to logical forms as part of the dialog system. This manner of training the semantic parser may be more effective than the traditional technique of training the semantic parser on an individual basis, due to the adversarial nature of training in a GAN.

FIG. 1 is a diagram of an example of a dialog system 100, according to certain embodiments described herein, which utilizes a semantic parser 114 trained in a GAN 155. The dialog system 100 is configured to receive speech inputs 104, also referred to as voice inputs, from a user 102. The dialog system 100 may then interpret the speech inputs 104. The dialog system 100 may maintain a dialog with a user 102 and may possibly perform or cause one or more actions to be performed based upon interpretations of the speech inputs 104. The dialog system 100 may prepare appropriate responses and may output the responses to the user using voice or speech output, also referred to as audio output. The dialog system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In certain embodiments, the processing performed by the dialog system 100 is implemented by a pipeline of components or subsystems, including a speech input component 105; a wake-word detection (WD) subsystem 106; an automatic speech recognition (ASR) subsystem 108; a natural language understanding (NLU) subsystem 110, which includes a named entity recognizer (NER) subsystem 112 and a semantic parser subsystem 114; a dialog manager (DM) subsystem 116; a natural language generator (NLG) subsystem 118; a text-to-speech (TTS) subsystem 120; and a speech output component 124. The subsystems listed above may be implemented only in software (e.g., using code, a program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a micro-phone coupled to software configured to digitize and transmit speech input 104 to the wake-word detection subsystem 106.

The wake-word detection (WD) subsystem 106 is configured to listen for and monitor a stream of audio input for input corresponding to a special sound or word or set of words, referred to as a wake-word. Upon detecting the wake-word for the dialog system 100, the WD subsystem 106 is configured to activate the ASR subsystem 108. In certain implementations, a user may be provided the ability to activate or deactivate the WD subsystem 106 (e.g., by pushing a button) to cause the WD subsystem 106 to listen for or stop listening for the wake-word. When activated, or when operating in active mode, the WD subsystem 106 is configured to continuously receive an audio input stream and process the audio input stream to identify audio input, such as speech input 104, corresponding to the wake-word. When audio input corresponding to the wake-word is detected, the WD subsystem 106 activates the ASR subsystem 108.

As described above, the WD subsystem 106 activates the ASR subsystem 108. In some implementations of the dialog system 100, mechanisms other than wake-word detection may be used to trigger or activate the ASR subsystem 108. For example, in some implementations, a push button on a device may be used to trigger the ASR subsystem 108 without needing a wake-word. In such implementations, the WD subsystem 106 need not be provided. When the push button is pressed or activated, the speech input 104 received after the button activation is provided to the ASR subsystem 108 for processing. Additionally or alternatively, in some implementations, the ASR subsystem 108 may be activated upon receiving an input to be processed.

The ASR subsystem 108 is configured to receive and monitor speech input 104 after a trigger or wake-up signal (e.g., a wake-up signal may be sent by the WD subsystem 106 upon the detection of the wake-word in the speech input 104, or the wake-up signal may be received upon the activation of a button) and to convert the speech input 104 to text. As part of its processing, the ASR subsystem 108 performs speech-to-text conversion. The speech input 104 may be in a natural language form, and the ASR subsystem 108 is configured to generate the corresponding natural language text in the language of the speech input 104. This corresponding natural language text is referred to herein as an utterance. For instance, the speech input 104 received by the ASR subsystem 108 may include one or more words, phrases, clauses, sentences, questions, or the like. The ASR subsystem 108 is configured to generate an utterance for each spoken clause and feed the utterances to the NLU subsystem 110 for further processing.

The NLU subsystem 110 receives utterances generated by the ASR subsystem 108. The utterances received by the NLU subsystem 110 from the ASR subsystem 108 may include text utterances corresponding to spoken words, phrases, clauses, or the like. The NLU subsystem 110 translates each utterance, or a series of utterances, to a corresponding logical form.

In certain implementations, the NLU subsystem 110 includes a named entity recognizer (NER) subsystem 112 and a semantic parser subsystem 114. The NER subsystem 112 receives an utterance as input, identifies named entities in the utterance, and tags the utterance with information related to the identified named entities. The tagged utterances are then fed to the semantic parser subsystem 114, which is configured to generate a logical form for each tagged utterance, or for a series of tagged utterances. The logical form generated for an utterance may identify one or more intents corresponding to the utterance. An intent for an utterance identifies an objective of the utterance. Examples of intents include "order pizza" and "find directions." An intent may, for example, identify an action that is requested to be performed. In addition to intents, a logical form generated for an utterance may also identify slots, also referred to as parameters or arguments, for an identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem 110 may use machine learning based techniques, rules, which may be domain specific, or a combination of machine learning techniques and rules to generate the logical forms. The logical forms generated by the NLU subsystem 110 are then fed to the DM subsystem 116 for further processing.

As shown in FIG. 1, in some embodiments, a training system 150 described herein trains the semantic parser subsystem 114, also referred to herein as the semantic parser 114, as part of a generative adversarial network 155 to prepare the semantic parser 114 for its operation in the dialog system 100. For instance, the training system 150 utilizes the GAN 155 to train the semantic parser 114 to perform the tasks described above for determining a logical form based on one or more utterances. In some embodiments, the dialog system 100 is improved over a conventional dialog system by the use of this adversarial technique of training the semantic parser 114.

The DM subsystem 116 is configured to manage a dialog with the user based on logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, or other actions. For example, the DM subsystem 116 is configured to interpret the intents identified in the logical forms received from the NLU subsystem 110. Based on the interpretations, the DM subsystem 116 may initiate one or more actions that it interprets as being requested by the speech inputs 104 provided by the user. In certain embodiments, the DM subsystem 116 performs dialog-state tracking based on current and past speech inputs 104 and based on a set of rules (e.g., dialog policies) configured for the DM subsystem 116. These rules may specify the different dialog states, conditions for transitions between states, actions to be performed when in a particular state, or the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output as audio to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and to respond using speech outputs 122 and, thereby, to maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

Figure 2:
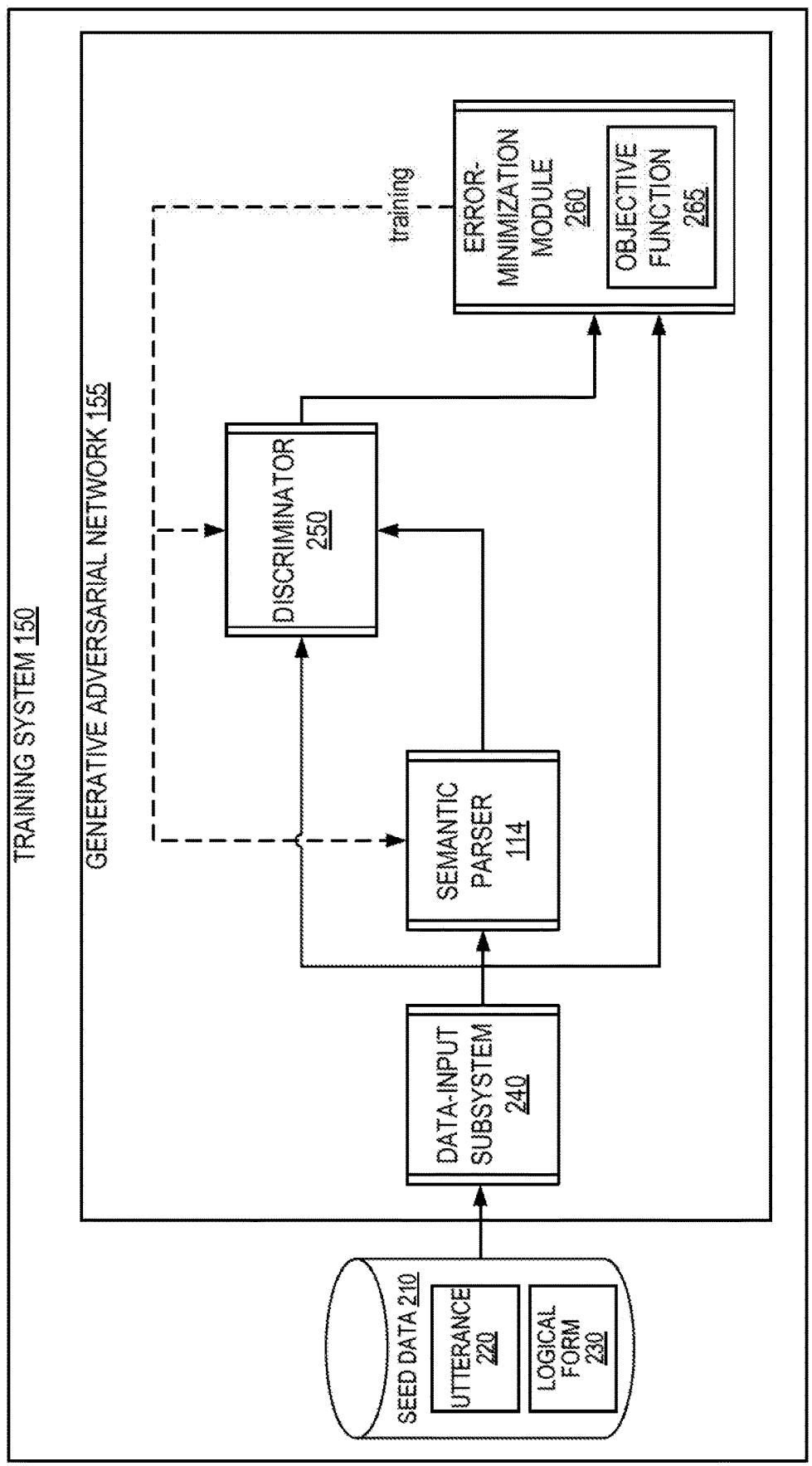
FIG. 2 is a diagram of a training system configured to train the semantic parser and a discriminator in the generative adversarial network, according to certain embodiments described herein.

FIG. 2 is a diagram of the training system 150 configured to train the semantic parser 114 of the dialog system 100 through the use of a generative adversarial network 155, according to certain embodiments described herein. More specifically, in some embodiments, the semantic parser 114 acts as a generator of the GAN 155, and the training system 150 trains the semantic parser 114 jointly with a discriminator 250 in the GAN 155. An error-minimization module 260 in the GAN 155 may provide one or more training signals back to the semantic parser 114 and the discriminator 250 to train the semantic parser 114 and the discriminator 250, more specifically, using backpropagation to train the semantic parser 114. A data-input subsystem 240 of the training system 150 may provide inputs, such as input based on seed data 210, to the semantic parser 114, the discriminator 250, and the error-minimization module 260 to enable the semantic parser 114, the discriminator 250, and the error-minimization module 260 to perform the tasks described herein. After training, the semantic parser 114 may be used as part of a dialog system 100 such as that shown in FIG. 1.

In some embodiments, the training system 150 is implemented as a computing device or portion thereof, such as a server. The training system 150 may be implemented as a specialized hardware device or as program code, or a combination of both. For instance, the operations described herein as being performed by the training system 150 may be embodied in program code implementing the training system 150, where such program code is executable by one or more processing units. For instance, the semantic parser 114, the discriminator 250, the error-minimization module 260, and other aspects of the GAN 155 may each be implemented as one or more software functions or specialized hardware devices and may operate together to implement the training system 150 as described herein. The semantic parser 114 and the discriminator 250 may each be implemented as a respective machine learning model, such as a neural network.

As shown in FIG. 2, the training system 150 may include a GAN 155, which includes a generator and a discriminator 250 trained jointly. Specifically, the generator may be the semantic parser 114 of a dialog system 100, and thus, the semantic parser 114 is trained within the GAN 155 before, or while, being integrated into the dialog system 100. Specifically, the training system 150 may train the semantic parser 114 to map utterances 220 to logical forms 230, and the training system 150 may train the discriminator 250 to determine whether a logical form 230 is authentic (i.e., shares a seed tuple with its corresponding utterance 220 in a set of seed data 210). Further, an error-minimization module 260 updates the semantic parser 114 and the discriminator 250 to minimize errors between expected predictions and actual predictions made in the GAN 155. In some embodiments, as part of the GAN 155, the semantic parser 114 and the discriminator 250 are trained jointly to cause each of the semantic parser 114 and the discriminator 250 to improve as the other improves. As a result, the semantic parser 114 learns to map utterances 220, such as utterances 220 tagged by the NER subsystem 112, to logical forms 230 useable by the DM subsystem 116.

In some embodiments, the semantic parser 114 is a neural network, such as a sequence-to-sequence (seq2seq) model, for determining logical forms 230 based on utterances 220. Conventionally, a semantic parser is trained with training data including a set of tuples, each tuple having an utterance and a corresponding logical form. As described herein, however, in some embodiments, the semantic parser 114 is trained as part of the GAN 155. As further described herein, the training utilizes seed data 210 that includes seed tuples, each seed tuple including an utterance 220 and a corresponding logical form 230. However, the training also incorporates output from the discriminator 250.

The discriminator 250 may be a binary classifier that maps a tuple to a class; for instance, the discriminator 250 may be implemented as a neural network. The discriminator 250 may receive as input a tuple including an utterance 220 and a logical form 136, and the discriminator 250 may output an indicator of whether the logical form 230 is an authentic representation of the utterance 220. For instance, the discriminator 250 may output a probability that the logical form 230 is authentic (i.e., paired with the utterance 220 in the seed data 210), and thus accurate. In some embodiments, to achieve this, the discriminator 250 may be trained jointly with the semantic parser 114 in the GAN 155 as described herein.

The error-minimization module 260 may provide a training signal to train the discriminator 250 and to train the semantic parser 114 by way of backpropagation. For instance, to train the discriminator 250, the error-minimization module 260 may utilize a first objective function 265 to compare the outputs from the discriminator 250, which are indications of whether logical forms 230 received are authentic, to an accurate distribution of indications of authenticity of those logical forms 230. The error-minimization module 260 may use the result of the first objective function 265 to train the discriminator 250 to make better predictions of authenticity.

To train the semantic parser 114, the error-minimization module 260 may utilize a second objective function 265, which may be the same as the first objective function 265, to compare the outputs from the discriminator 250, indicating predictions of authenticity of logical forms 230 output of the semantic parser 114, to a selected distribution (i.e., a desired distribution) of indications of authenticity of those logical forms 230. That selected distribution may be a distribution indicating that all logical forms 230 output by the semantic parser 114 are authentic. This is because, in some embodiments, the training system 150 seeks to provide a semantic parser 114 whose outputs are always deemed authentic. One of skill in the art will understand how to construct such objective functions 265. In some embodiments, although the semantic parser 114 and the discriminator 250 are trained jointly within the GAN 155, no more than one of the semantic parser 114 and the generator is actively being updated based on the training signal from the error-minimization module 260 at a given time.

Figure 3:
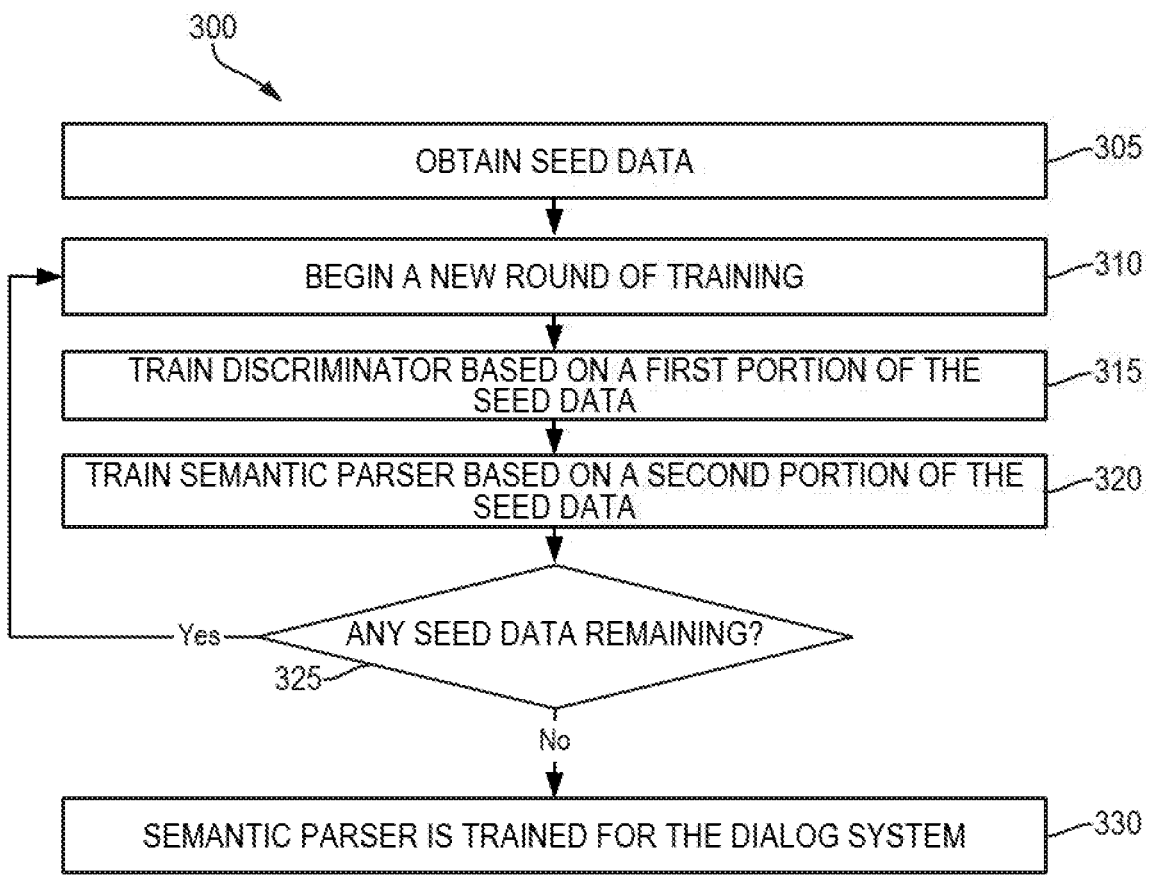
FIG. 3 is a diagram of a method of training the semantic parser jointly with the discriminator in the generative adversarial network, according to certain embodiments described herein.

FIG. 3 is a diagram of a method 300 of training the semantic parser 114 jointly with a discriminator 250 in a GAN 155, according to certain embodiments described herein. In some embodiments, this method 300 or similar is performed prior to the semantic parser 114 being used in a dialog system 100. Through the training described herein, the semantic parser 114 may learn to translate (i.e., to map) utterances 220 to logical forms 230 representing such utterances 220, which is a task performed by the semantic parser 114 as part of the dialog system 100.

The method 300 depicted in FIG. 3, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 300 is intended to be illustrative and non-limiting. Although FIG. 3 depicts various activities occurring in a particular sequence or order, this is not intended to be limiting. In certain embodiments, for instance, the activities may be performed in a different order, or one or more activities of the method 300 may be performed in parallel. In certain embodiments, the method 300 may be performed by the training system 150.

As shown in FIG. 3, at block 305, the data-input subsystem 240 of the training system 150 obtains seed data 210. The seed data 210 may include a set of seed tuples, with each seed tuple including an utterance 220 and a corresponding logical form 230. In each seed tuple, the logical form 230 is an accurate and authentic representation, or translation, of the utterance 220. It will be understood that various techniques exist for obtaining the seed data 210. For instance, the seed data 210 may be manually determined, such as through crowdsourcing, and then stored in a memory device accessible by the data-input subsystem 240.

At block 310, the training system 150 begins anew round of training. Block 310 is the beginning of an iterative loop. In some embodiments, during each iteration of the loop, the training system 150 conducts a round of training. Each round of training may include training the discriminator 250 during part of the round and training the semantic parser 114 during another part of the round. Although these two parts of the round may be performed in parallel, the two parts are performed sequentially in some embodiments to enable training of the semantic parser 114 in the second part to benefit from training of the discriminator 250 in the first part. Further, the training system 150 may utilize a different subset of the seed data 210 for each round of training the discriminator 250 and the semantic parser 114 and, as such, for each iteration of the loop.

At block 315, the training system 150 conducts training of the discriminator 250 based on a first portion of the seed data 210 obtained at block 305. In some embodiments, this first portion of the seed data 210 has not yet been used for training in a prior round. During this training of the discriminator 250, the semantic parser 114 may be fixed to enable updating of the discriminator 250 based on the discriminator's predictions as to the authenticity of output from the semantic parser 114, without variation in how the semantic parser 114 determines that output. Activities involved in training the discriminator 250 during a round of training are described in more detail below, with reference to FIG. 4.

At block 320, the training system 150 conducts training of the semantic parser 114 based on a second portion of the seed data 210 obtained at block 305. In some embodiments, this second portion of the seed data 210 is a different from the first portion used at block 310 (e.g., has no overlap in seed tuples) and has not yet been used for training in a prior round. During this training of the semantic parser 114, the discriminator 250 may be fixed to enable updating of the semantic parser 114 based on the discriminator's predictions as to the authenticity of output from the semantic parser 114, without variation in how the discriminator 250 determines that authenticity. Activities involved in training the semantic parser 114 during a round of training are described in more detail below, with reference to FIG. 5.

At decision block 325, the training system 150 determines whether all the seed data 210 obtained at block 305 has been selected and used for some round of training (i.e., some iteration of the loop) as described above. If not all the seed data 210 has been used, the method 300 may return to block 310, where another round of training begins. If all the seed data 210 has been used in the training, however, then the method 300 may end at block 330, at which time the semantic parser 114 has been trained and may be ready for use in the dialog system 100.

Figure 4:
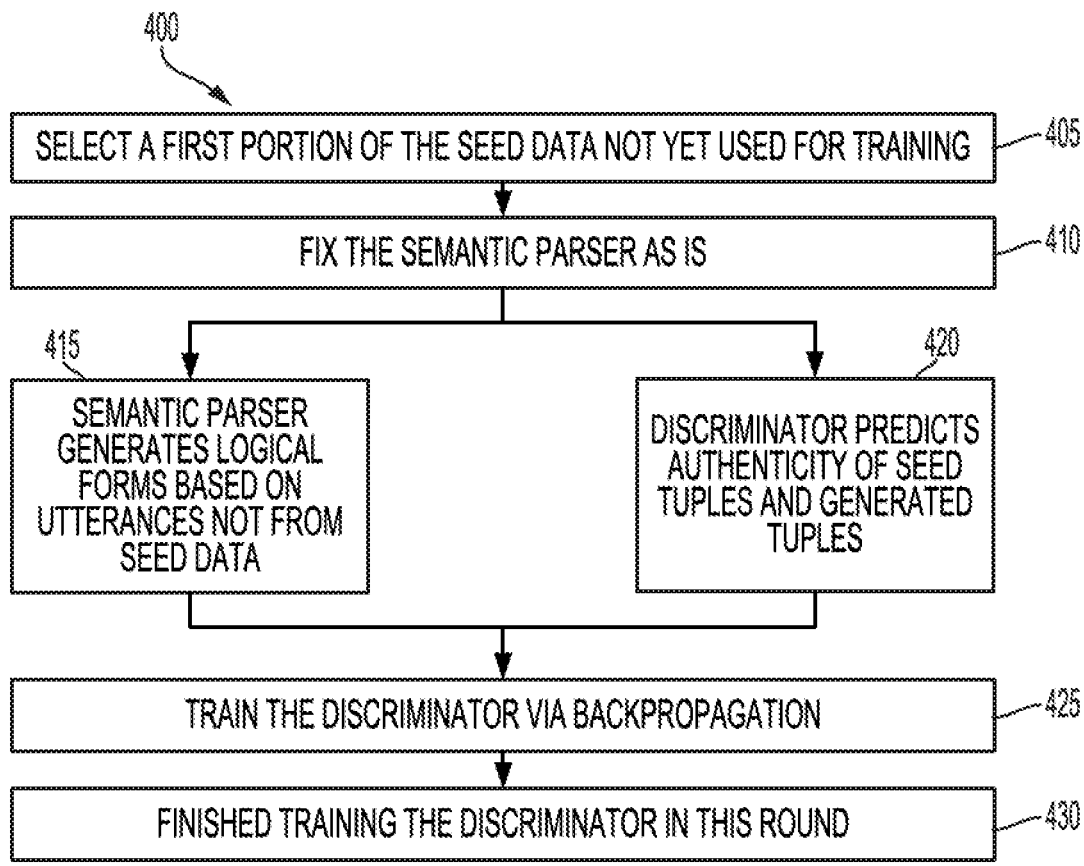
FIG. 4 is a diagram of a method of training the discriminator as part of a round of training in the method of FIG. 3, according to certain embodiments described herein.

FIG. 4 is a diagram of a method 400 of training the discriminator 250 as part of a round of training in the GAN 155, according to certain embodiments described herein. Specifically, the training system 150 may perform this method 400 or similar at block 315 of the above method 300, to train the discriminator 250 within a single round of training. Thus, this method 400 or similar may be performed once per iteration according to some embodiments.

The method 400 depicted in FIG. 4, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 400 is intended to be illustrative and non-limiting. Although FIG. 4 depicts various activities occurring in a particular sequence or order, this is not intended to be limiting. In certain embodiments, for instance, the activities may be performed in a different order, or one or more activities of the method 400 may be performed in parallel. In certain embodiments, the method 400 may be performed by the training system 150.

At block 405, the data-input subsystem 240 of the training system 150 selects a first portion of the seed data 210, where the first portion has not been used in prior rounds of training. In some embodiments, this first portion of the seed data 210 is a subset of the seed tuples in the seed data 210; for instance, the first portion of the seed data 210 may be a proper subset of the seed tuples in the seed data 210 such that not all seed tuples of the seed data 210 are included in the first portion.

At block 410, the semantic parser 114 is fixed while the discriminator 250 is open for updates. In other words, in some embodiments, the semantic parser 114 will remain static for the time being to enable the discriminator 250 to be trained based on the current state of the semantic parser 114.

In some embodiments, block 415 and block 420 are performed in parallel. At block 415, the data-input subsystem 240 of the training system 150 inputs a stream of utterances 220 to the semantic parser 114, which generates logical forms 230 based on the stream of utterances 220 input to the semantic parser 114. The utterances 220 in the stream of utterances 220 may be utterances 220 that are not from the seed data 210 but are, for instance, generated randomly or selected randomly by the data-input subsystem 240 or by some other component. For example, and not by way of limitation, the utterances 220 may be selected from a corpus (e.g., one or more books or articles) written in natural language. For each such utterance 220 received, the semantic parser 114 may generate a logical form 230. Early in the training, the semantic parser's output of logical forms 230 may be poor. For instance, the logical forms 230 generated may be random (e.g., a random arrangement of words and symbols). However, as training proceeds throughout the round or over multiple rounds, the semantic parser 114 may improve.

At block 420, which may be performed in parallel with block 415, the data-input subsystem 240 of the training system 150 may input to the discriminator 250 a stream of tuples, and the discriminator 250 may generate predictions of authenticity for those tuples. Each tuple in the stream of tuples may include an utterance 220 and a logical form 230. The data-input subsystem 240 may provide this stream of tuples as a combination (e.g., a random or arbitrary combination) of (1) seed tuples from the first portion of the seed data 210, selected at block 405, and (2) tuples having logical forms 230 that have been generated by the semantic parser 114 at block 415. Based on the stream of tuples, the discriminator 250 may output predictions of authenticity corresponding to the tuples. In other words, given a tuple, the discriminator 250 may predict whether the logical form 230 in the tuple is an authentic representation of the utterance 220 in the tuple, or in other words, the discriminator 250 may guess whether the tuple is part of the seed data 210 rather than the logical form 230 having been generated by the semantic parser 114. The tuples received by the discriminator 250 may include both seed tuples, which are in the first portion of the seed data 210, and generated tuples, each of which includes an utterances 220 received by the semantic parser 114 and the corresponding logical form 230 generated by the semantic parser 114 at block 415.

In some embodiments, the discriminator 250 is not notified of which tuples are from the seed data 210, and are thus authentic, and which tuples are from the semantic parser 114, and are thus generated. For each tuple, the discriminator 250 may classify the tuple based on deemed authenticity. To this end, the discriminator 250 may output a score indicating its determination (i.e., prediction) of the likelihood that the logical form 230 is an authentic representation of the corresponding utterance 220 in the tuple; for instance, the score is a probability that the logical form 230 is an authentic representation of the corresponding utterance 220 in the tuple and, thus, that the tuple is from the seed data 210. Ideally, the discriminator 250 outputs a high probability, such as 1, for an authentic tuple (i.e., a seed tuple) and a low probability, such as 0, for a generated tuple. Early in the training, the discriminator's output may be poor. For instance, the probabilities output may be random numbers in a fixed range (e.g., between 0 and 1 inclusively). However, as training proceeds throughout the round or over multiple rounds, the discriminator 250 may improve.

At block 425, the error-minimization module 260 of the training system 150 generates a training signal to train the discriminator 250 based on the outputs of the semantic parser 114 and the discriminator 250, as determined at block 415 and block 420. In some embodiments, the data-input subsystem 240 of the training system 150 provides the first portion of the seed data 210, as accessed at block 405, to the error-minimization module 260 to enable the error-minimization module 260 to determine the training signal.

For instance, the error-minimization module 260 may apply a first objective function 265 that compares an accurate distribution (i.e., an accurate sequence of values) of predictions to the actual distribution (i.e., the actual sequence of values) of predictions from the discriminator 250 so as to determine a divergence, or degree of difference, between those two distributions. The error-minimization module 260 may have access to the first portion of the seed data 210 and may thus be aware of which tuples received by the discriminator 250 are authentic and which tuples are generated. As such, the error-minimization module 260 is aware that an accurate distribution assigns a value of 1 (i.e., one hundred percent probability) to seed tuples and a value of 0 (i.e., zero percent probability) to generated tuples, which are not authentic. Thus, the error-minimization module 260 may use the first objective function 265 to compare this accurate distribution to the actual output of the discriminator 250, so as to provide a training signal to the discriminator 250. The training signal represents an error in the predictions made by the discriminator 250. Based on the training signal, the training system 150 may update the discriminator 250 to reduce the error between the accurate distribution and the actual distribution. For instance, the nodes of the neural network acting as the discriminator 250 may be updated based on the training signal.

In some embodiments, as shown in FIG. 4, block 425 is performed following block 415 and block 420. In that case, the error-minimization module 260 may provide the training signal only after the discriminator 250 has received all tuples being used to train the discriminator 250 in this round of training. As such, the discriminator 250 may be updated once based on a batch that includes the entire first portion of the seed data 210 and the generated tuples described above. Alternatively, however, block 425 may be performed in parallel with block 415 and block 420, such that a training signal is sent back to the discriminator 250 while the discriminator 250 is evaluating inputs, such that the discriminator 250 is updated while the first portion of the seed data 210 and the generated tuples are still being provided.

At block 430, the training system 150 ends training of the discriminator 250 in the current round of training. As such, the semantic parser 114, which was fixed at block 410, is unlocked and need not remain fixed as training proceeds.

Figure 5:
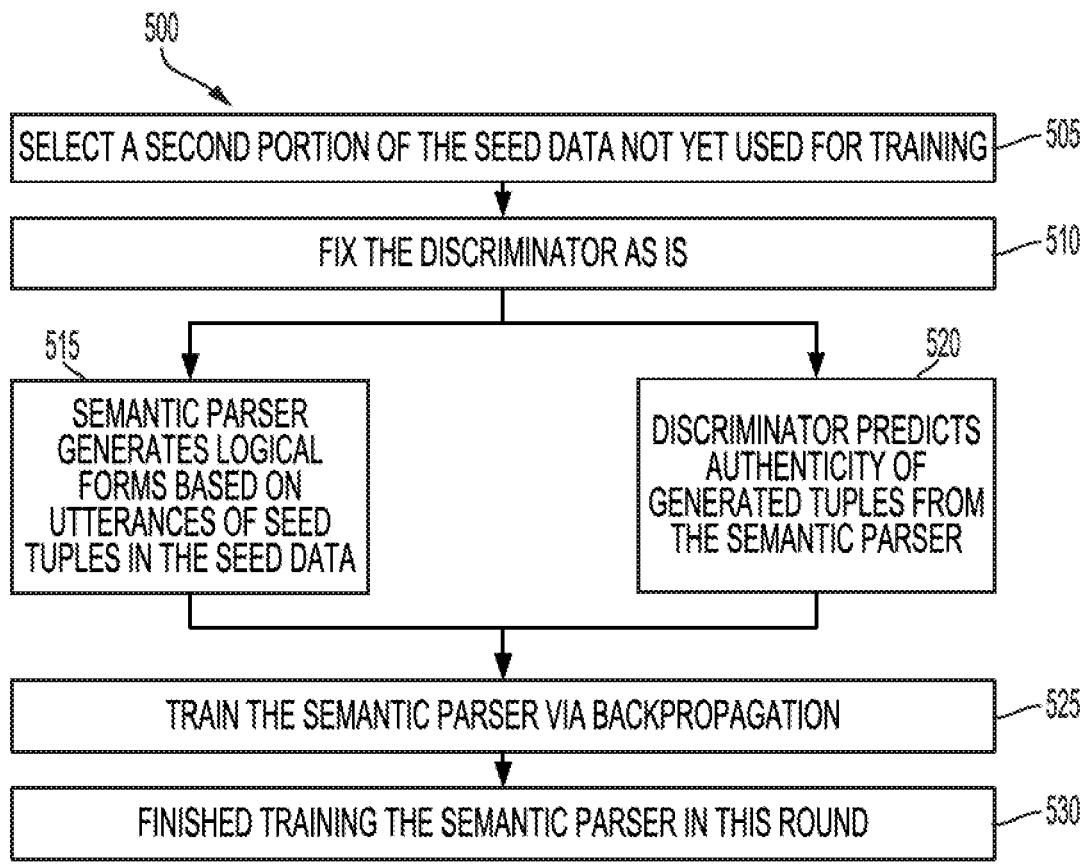
FIG. 5 is a diagram of a method of training the semantic parser as part of the round of training in the method of FIG. 3, according to certain embodiments described herein.

FIG. 5 is a diagram of a method of training the semantic parser as part of a round of training in the GAN 155, according to certain embodiments described herein. Specifically, the training system 150 may perform this method 500 or similar at block 320 of the above method 300, to train the semantic parser 114 within a single round of training. Thus, this method 500 or similar may be performed once per iteration according to some embodiments.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the training system 150.

At block 505, the data-input subsystem 240 of the training system 150 selects a second portion of the seed data 210, where the second portion has not been used in prior rounds of training. In some embodiments, this second portion of the seed data 210 is a subset of the seed tuples in the seed data 210; for instance, the second portion of the seed data 210 may be a proper subset of the seed tuples in the seed data 210 such that not all seed tuples of the seed data 210 are included in the second portion. Additionally, in some embodiments, the second portion of the seed data 210 is different from the first portion; alternatively, however, the second portion may be same as the first portion of the seed data 210. In either case, the remainder of the seed data 210 outside of the first portion and the second portion may be used in later iterations of the overall method 300 of training.

At block 510, the discriminator 250 is fixed while the semantic parser 114 is open to updates. In other words, in some embodiments, the discriminator 250 will remain static for the time being to enable the semantic parser 114 to be trained based on the current state of the discriminator 250.

In some embodiments, block 515 and block 520 are performed in parallel. At block 515, the data-input subsystem 240 of the training system 150 inputs to the semantic parser 114 utterances 220 from the second portion of the seed data 210 that was selected at block 505, and the semantic parser 114 generates logical forms 230 based on such utterances 220. Early in the training, the semantic parser's output of logical forms 230 may be poor. For instance, the logical forms 230 generated may be random (e.g., a random arrangement of words and symbols). However, as training proceeds throughout the round of training or over multiple rounds, the semantic parser 114 may improve.

At block 520, which may be performed in parallel with block 515, the data-input subsystem 240 of training system 150 may input to the discriminator 250 a stream of tuples, and the discriminator 250 may make a prediction of authenticity for each tuple in the stream. Each tuple in the stream of tuples may include an utterance 220 and a corresponding logical form 230. More specifically, each tuple received may include an utterance 220 from a respective seed tuple selected from the second portion of the seed data 210, as selected at block 505, along with the generated logical form 230 output by the semantic parser 114, at block 515, based on that utterance 220 being provided as input to the semantic parser 114. For each tuple received, the discriminator 250 may classify the tuple based on deemed authenticity. Specifically, the discriminator 250 may output a score indicating a likelihood of authenticity; for instance, the score determined by the discriminator 250 for a tuple may be a probability that the logical form 230 is an authentic and thus accurate representation of the corresponding utterance 220 in the tuple or, in other words, the probability that the tuple is a seed tuple from the seed data 210. At this point, the discriminator 250 has received some training, as described with reference to FIG. 4, so while its output may still need improvement, the discriminator 250 may continue to improve during later rounds of training.

At block 525, the error-minimization module 260 of the training system 150 generates a training signal to train the semantic parser 114 via backpropagation, based on the outputs of the semantic parser 114 and the discriminator 250, as determined at block 515 and block 520. To this end, for instance, the error-minimization module 260 applies a second objective function 265 that determines a divergence between a selected distribution of predictions form the discriminator 250 and the actual distribution of predictions from the discriminator 250. The second objective function 265 may, but need not, be the same as the first objective function 265 used in training the discriminator 250. In some embodiments, because the training system 150 seeks to improve the semantic parser 114 to enable the semantic parser 114 to fool the discriminator 250 into predicting that the outputs of the semantic parser 114 are all authentic, a selected distribution of predictions is a series of ones. In some embodiments, such a distribution of predictions would indicate that all logical forms 230 generated by the semantic parser 114 are authentic. Thus, the second objective function 265 may compare this selected distribution (e.g., of a series of ones) to the actual distribution of outputs from the discriminator 250 at block 520 to determine a degree of difference between these distributions.

The error-minimization module 260 may use the second objective function 265 to compare this selected distribution to the actual predictions of the discriminator 250, so as to provide a training signal to the semantic parser 114. The training signal represents an error in the predictions made as compared to those that were selected (i.e., desired). Based on the training signal, the semantic parser 114 may be updated to reduce the error between the selected distribution and the actual distribution. For instance, the nodes of the neural network acting as the semantic parser 114 may be updated based on the training signal.

In some embodiments, as shown in FIG. 5, block 525 is performed following block 515 and block 520. In this case, the error-minimization module 260 may provide the training signal only after the semantic parser 114 has received all utterances 220 in the second portion of the seed data 210. As such, the semantic parser 114 is updated based on a batch that includes the entire second portion of the seed data 210. Alternatively, however, block 525 may be performed in parallel with block 515 and block 520, such that a training signal is sent back to the semantic parser 114 while the semantic parser 114 is evaluating inputs, such that the semantic parser 114 is updated while utterances 220 from the second portion of the seed data 210 are being provided.

Thus, as described above, a GAN 155 can be used to train the semantic parser 114 for use in a dialog system 100. Various modifications may be made to the techniques described above, and such modifications are within the scope of this disclosure. For instance, a semi-supervised GAN (SGAN) may be used as the GAN 155 to jointly train a supervised discriminator, an unsupervised discriminator, and the semantic parser 114. An SGAN may be particularly useful if the seed data 210 is a relatively small set, even for GAN training. Additionally or alternatively, the discriminator 250 may incorporate information about a grammar with which logical forms 230 must comply. Through reference to this grammar, the discriminator 250 may more accurately determine whether a logical form 230 is authentic, which may encourage the semantic parser 114 to improve more rapidly.

Figure 6:
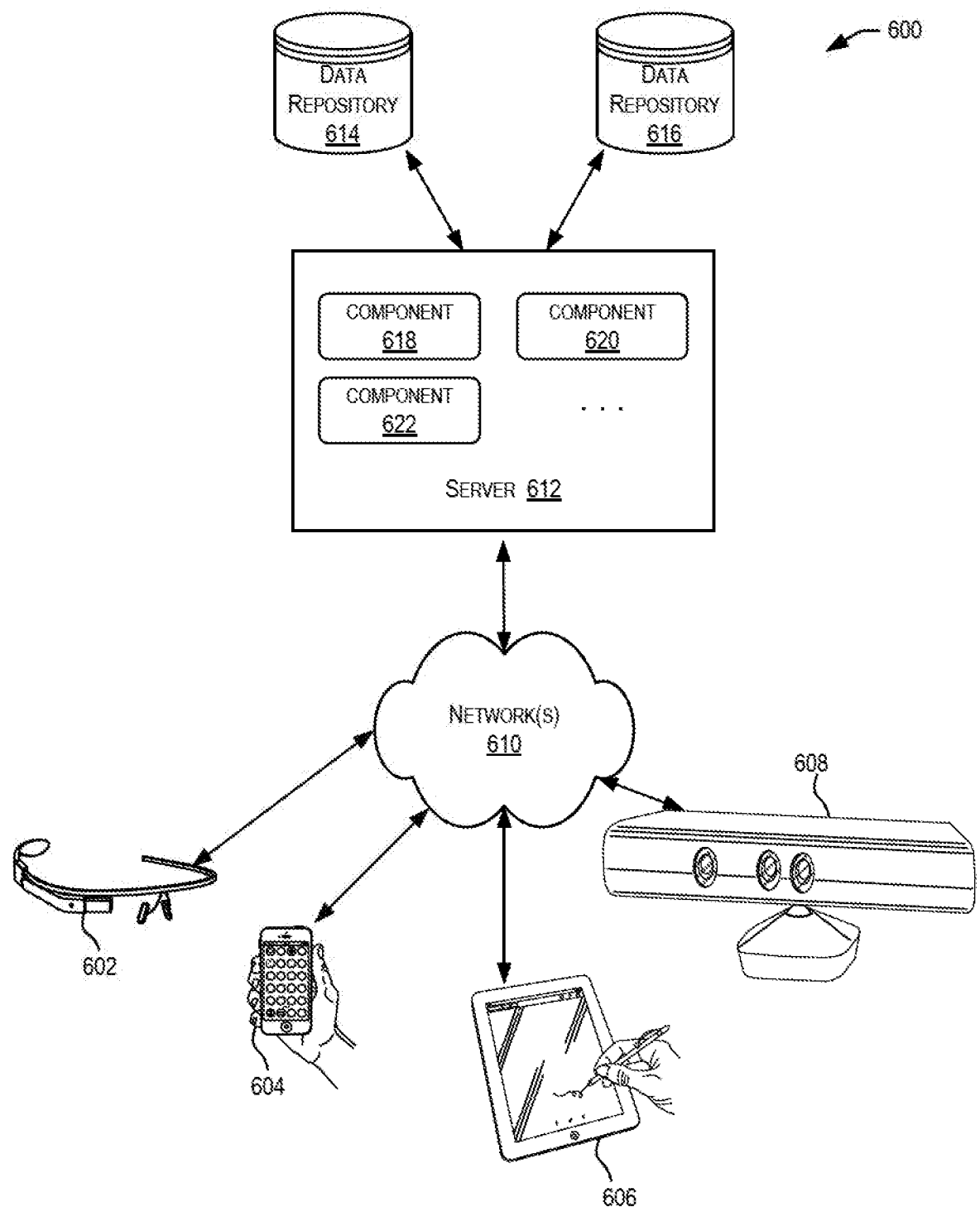
FIG. 6 is a diagram of a distributed system for implementing certain embodiments described herein.

FIG. 6 is a diagram of a distributed system 600 for implementing certain embodiments. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the use of backpropagation in a GAN 155 to train the semantic parser 114 of a dialog system 100 as described herein. For instance, server 612 may execute some or all aspects of the training system 150 or some or all aspects of the dialog system 100.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components. More specifically, for instance, each of client computing devices 602, 604, 606, and/or 608 may be an embedded device configured to execute the dialog system 100 and, further, configured to communicate with server 612 to enable server 612 to train the semantic parser 114 of a dialog system 100 through backpropagation in a GAN 155 as described herein.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to interact with aspects of the dialog system 100 provided by server 612 in accordance with the teachings of this disclosure. A client device may provide an interface (e.g., a speech interface) that enables a user of the client device to interact with the client device. The client device may also output information to the user via this interface. Although FIG. 6 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of data repositories 614, 616 may be used to store seed data 210 or other data required to train the semantic parser 114 of a dialog system 100 by backpropagation in a GAN 155 as described herein. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
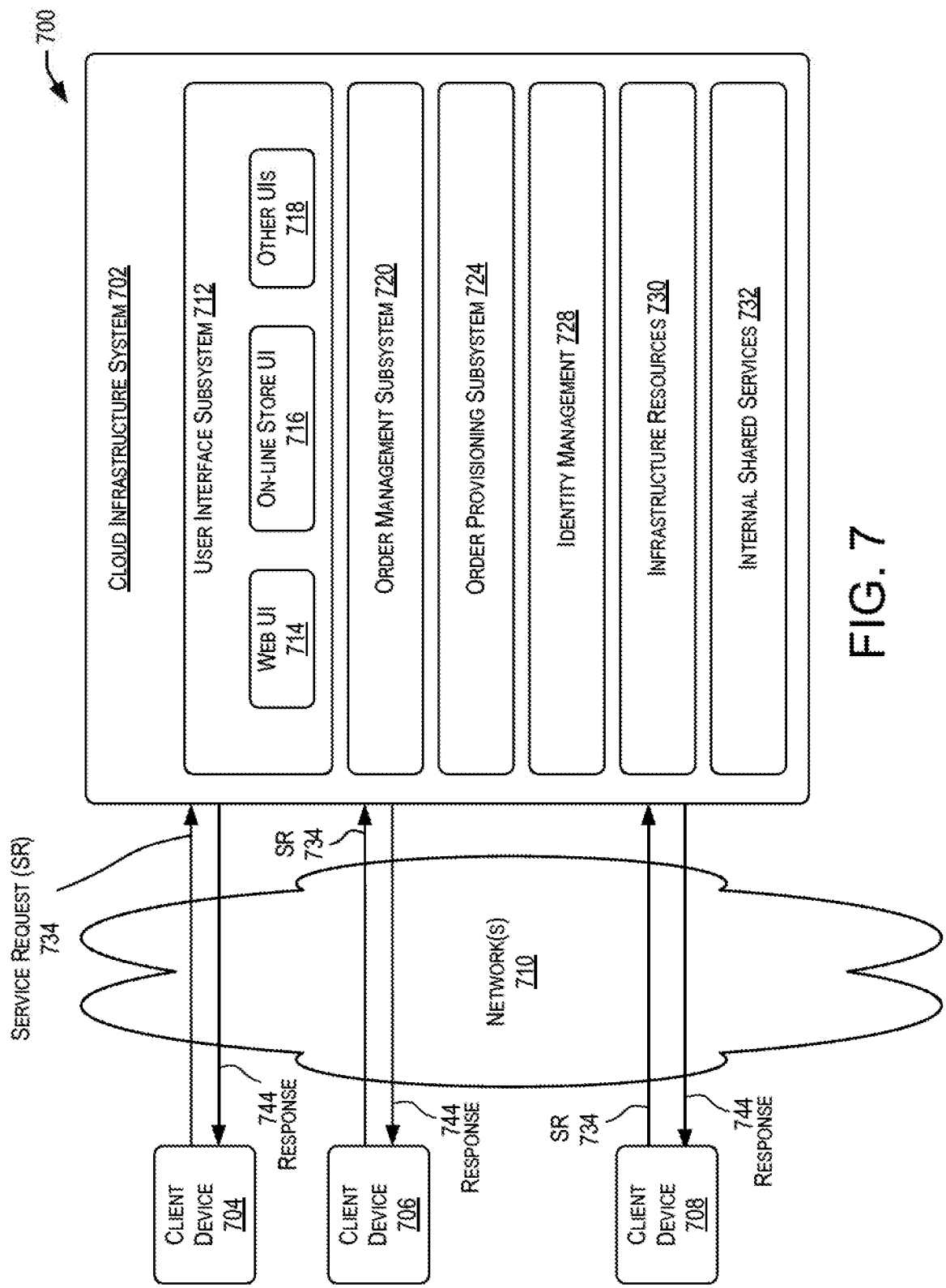
FIG. 7 is a block diagram of a cloud-based system environment in which training a semantic parser in a generative adversarial network may be offered at least in part as a cloud service, according to certain embodiments described herein.

In certain embodiments, all or a portion of training the semantic parser 114 of a dialog system 100 by backpropagation in a GAN 155, as described herein, may be offered as services via a cloud environment. FIG. 7 is a block diagram of a cloud-based system environment in which training the semantic parser 114, as described herein, may be offered at least in part as a cloud service, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between client computing devices 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a customer may subscribe to information services or other services provided by the dialog system 100 in conversational form. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client computing device to interact with cloud infrastructure system 702, such as to request a service provided by cloud infrastructure system 702. An attacker may use a client device to send malicious requests.

In some embodiments, the processing performed by cloud infrastructure system 702 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for providing training of a semantic parser 114 by backpropagation in a GAN 155 as described herein. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the infrastructure resources 730 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and that facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke an order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
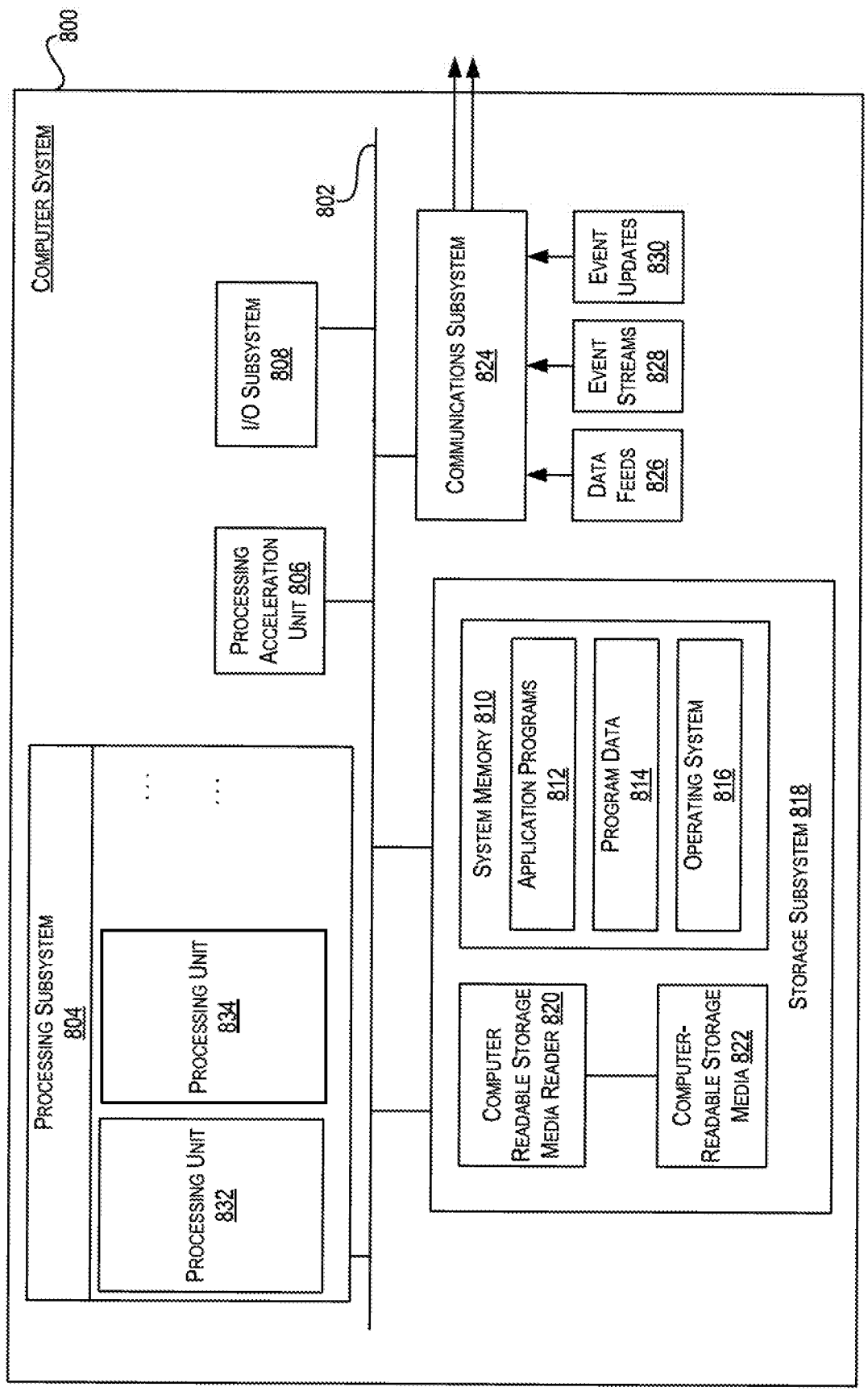
FIG. 8 is a block diagram of an example computer system that may be used to implement certain embodiments described herein.

FIG. 8 is a block diagram of an example computer system 800 that may be used to implement certain embodiments. For example, in some embodiments, computer system 800 may be used to implement any of systems, subsystems, and components described herein. For example, multiple host machines may provide and implement training of the semantic parser 114 of a dialog system 100 in a GAN 155 as described herein. Computer systems such as computer system 800 may be used as host machines. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer-readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing training of the semantic parser 114 of a dialog system 100 in a GAN 155, as described herein, may be executed in system memory 810.

Computer-readable storage media 822 may store programming and data constructs that provide the functionality of some embodiments. Computer-readable storage media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for training a semantic parser of a dialog system, the method comprising:
    accessing seed data comprising seed tuples, each seed tuple of the seed data comprising a respective seed utterance and a respective seed logical form corresponding to the respective seed utterance; and
    training a semantic parser and a discriminator in a generative adversarial network (GAN), wherein, in the GAN, the semantic parser learns to map utterances to logical forms and the discriminator learns to recognize authentic logical forms, wherein training the semantic parser and the discriminator in the GAN comprises:
        training the discriminator with a first portion of the seed data based on output from the semantic parser to determine an updated discriminator; and
        training the semantic parser with a second portion of the seed data based on output from the updated discriminator to determine an updated semantic parser;
    wherein the semantic parser is useable as part of a dialog system.

2. The method of claim 1, wherein training the semantic parser and the discriminator in the GAN comprises:
    inputting random utterances to the semantic parser;
    determining, by the semantic parser, generated logical forms based on the random utterances;
    inputting, to the discriminator, tuples comprising generated tuples and a subset of seed tuples selected from the seed data, wherein the generated tuples comprise the random utterances and the generated logical forms; and determining, by the discriminator, predicted authenticities of the tuples.

3. The method of claim 2, wherein training the semantic parser and the discriminator in the GAN further comprises:
comparing the predicted authenticities to actual authenticities of the tuples; and
comparing the predicted authenticities to the actual authenticities of the tuples.

4. The method of claim 3, wherein an actual authenticity of a tuple, in the tuples, is based on the tuple being a seed tuple in the seed data.

5. The method of claim 3, wherein training the semantic parser and the discriminator in the GAN further comprises:
inputting seed utterances to the semantic parser, wherein the seed utterances are selected from the seed tuples;
determining, by the semantic parser, additional generated logical forms based on the seed utterances;
inputting, to the discriminator, additional generated tuples comprising the seed utterances from the seed data and the additional generated logical forms; and
determining, by the discriminator, additional predicted authenticities of the additional generated tuples.

6. The method of claim 5, wherein training the semantic parser and the discriminator in the GAN further comprises:
comparing the additional predicted authenticities to selected authenticities of the additional generated tuples; and
comparing the additional predicted authenticities to the selected authenticities of the additional generated tuples.

7. The method of claim 6, wherein the selected authenticities of the additional generated tuples indicate that the additional generated tuples are authentic.

8. The method of claim 1, wherein the semantic parser and the updated discriminator are static during the training.

9. The method of claim 8, wherein the semantic parser is a sequence-to-sequence neural network, and the discriminator is a binary classifier.

10. The method of claim 1, further comprising:
receiving, by the dialog system, a speech input;
applying an automatic speech recognition subsystem to the speech input to determine an utterance;
applying the semantic parser to the utterance to determine a logical form;
analyzing the logical form to generate a response text responsive to the speech input; and
applying a text-to-speech subsystem to the response to text to determine audio output for the dialog system.

11. A training system comprising:
a data-input subsystem configured to access seed data comprising seed tuples, each seed tuple of the seed data comprising a respective seed utterance and a respective seed logical form corresponding to the respective seed utterance; and
a generative adversarial network (GAN) comprising:
a discriminator configured to learn to recognize authentic logical forms; and
a semantic parser configured to learn to map utterances to logical forms; and
an error-minimization module configured to train the discriminator with a first portion of the seed data based on output from the semantic parser to determine an updated discriminator, and train the semantic parser with a second portion of the seed data based on output from the updated discriminator to determine an updated semantic parser,
wherein the semantic parser is useable as part of a dialog system.

12. The training system of claim 11, wherein:
the data-input subsystem is configured to input random utterances to the semantic parser;
the semantic parser is configured to generate logical forms based on the random utterances;
the data-input subsystem is configured to input, to the discriminator, tuples comprising generated tuples and a subset of seed tuples selected from the seed data, wherein the generated tuples comprise the random utterances and the generated logical forms; and
the discriminator is configured to predict authenticities of the tuples.

13. The training system of claim 12, wherein the error-minimization module is further configured to:
compare the predicted authenticities to actual authenticities of the tuples; and
compare the predicted authenticities to the actual authenticities of the tuples.

14. The training system of claim 13, wherein an actual authenticity of a tuple, in the tuples, is based on the tuple being a seed tuple in the seed data.

15. The training system of claim 13, wherein:
the data-input subsystem is further configured to input seed utterances to the semantic parser, wherein the seed utterances are selected from the seed tuples;
the semantic parser is configured to determine additional generated logical forms based on the seed utterances;
the data-input subsystem is configured to input, to the discriminator, additional generated tuples comprising the seed utterances from the seed data and the additional generated logical forms; and
the discriminator is configured to determine additional predicted authenticities of the additional generated tuples.

16. The training system of claim 15, wherein the error-minimization module is further configured to:
compare the additional predicted authenticities to selected authenticities of the additional generated tuples; and
compare the additional predicted authenticities to the selected authenticities of the additional generated tuples.

17. The training system of claim 16, wherein the selected authenticities of the additional generated tuples indicate that the additional generated tuples are authentic.

18. The training system of claim 11, wherein the semantic parser is a sequence-to-sequence neural network, and the discriminator is a binary classifier.

19. A computer-program product for training a semantic parser of a dialog system, the computer-program product comprising a computer-readable storage medium having program instructions embodied thereon, the program instructions executable by one or more processors to cause the one or more processors to perform a method comprising:
accessing seed data comprising seed tuples, each seed tuple of the seed data comprising a respective seed utterance and a respective seed logical form corresponding to the respective seed utterance;
training a discriminator of a generative adversarial network (GAN) based on a semantic parser of the GAN, wherein training the discriminator comprises:
inputting random utterances to the semantic parser;
determining, by the semantic parser, generated logical forms based on the random utterances;
inputting, to the discriminator, tuples comprising generated tuples and a subset of seed tuples selected from the seed data, wherein the generated tuples comprise the random utterances and the generated logical forms;

determining, by the discriminator, predicted authenticities of the tuples;

comparing the predicted authenticities to actual authenticities of the tuples; and updating the discriminator based on comparing the predicted authenticities to the actual authenticities of the tuples; and training the semantic parser of the GAN based on the discriminator of the GAN, wherein training the semantic parser comprises:

inputting seed utterances to the semantic parser, wherein the seed utterances are selected from the seed tuples;

determining, by the semantic parser, additional generated logical forms based on the seed utterances;

inputting, to the discriminator, additional generated tuples comprising the seed utterances from the seed data and the additional generated logical forms;

determining, by the discriminator, additional predicted authenticities of the additional generated tuples;

comparing the additional predicted authenticities to selected authenticities of the additional generated tuples; and updating the semantic parser based on comparing the additional predicted authenticities to the selected authenticities of the additional generated tuples, wherein the semantic parser is useable to map utterances to logical forms in a dialog system.

20. The computer-program product of claim 19, wherein:

an actual authenticity of a tuple, in the tuples, is based on the tuple being a seed tuple in the seed data; and the selected authenticities of the additional generated tuples indicate that the additional generated tuples are authentic.

* * * * *

UNITED STATES PATENT AND TRADEMARK OFFICE
CERTIFICATE OF CORRECTION

PATENT NO. : 11,908,460 B2  
APPLICATION NO. : 16/992306  
DATED : February 20, 2024  
INVENTOR(S) : Duong et al.

Page 1 of 1

It is certified that error appears in the above-identified patent and that said Letters Patent is hereby corrected as shown below:

In the Specification

In Column 4, Line 9, delete "lean" and insert -- learn --, therefor.

In Column 9, Line 40, delete "anew" and insert -- a new --, therefor.

Signed and Sealed this  
Ninth Day of July, 2024

Katherine Kelly Vidal  
*Director of the United States Patent and Trademark Office*